(12) United States Patent
Roche et al.

(10) Patent No.: US 12,534,219 B2
(45) Date of Patent: Jan. 27, 2026

(54) GRAPHIC DATA PROCESSING SYSTEM

(71) Applicant: SAFRAN ELECTRONICS & DEFENSE COCKPIT SOLUTIONS, Montreuil (FR)

(72) Inventors: Olivier Roche, Moissy Cramayel (FR); Romain De Bossoreille, Moissy Cramayel (FR); Michael Nahmiyace, Moissy Cramayel (FR)

(73) Assignee: SAFRAN ELECTRONICS & DEFENSE COCKPIT SOLUTIONS, Montreuil (FR)

( * ) Notice: Subject to any disclaimer, the term of this patent is extended or adjusted under 35 U.S.C. 154(b) by 441 days.

(21) Appl. No.: 17/629,353

(22) PCT Filed: Jul. 23, 2020

(86) PCT No.: PCT/EP2020/070839
§ 371 (c)(1),
(2) Date: Jan. 21, 2022

(87) PCT Pub. No.: WO2021/013948
PCT Pub. Date: Jan. 28, 2021

(65) Prior Publication Data
US 2022/0250764 A1  Aug. 11, 2022

(30) Foreign Application Priority Data
Jul. 23, 2019 (FR) ........................... 1908358

(51) Int. Cl.
*B64D 43/00* (2006.01)
*G06T 15/00* (2011.01)

(52) U.S. Cl.
CPC ............ *B64D 43/00* (2013.01); *G06T 15/005* (2013.01); *G06T 2200/24* (2013.01)

(58) Field of Classification Search
CPC ... B64D 43/00; G06T 15/005; G06T 2200/24; G06T 1/20; G06F 15/7832; G06F 3/147
See application file for complete search history.

(56) References Cited

U.S. PATENT DOCUMENTS

| | | | | |
|---|---|---|---|---|
| 8,044,964 | B2* | 10/2011 | Kurata | G06T 1/20 345/531 |
| 9,922,651 | B1* | 3/2018 | Nelson | G06F 3/017 |
| 2008/0049029 | A1* | 2/2008 | Kurata | G06V 10/955 345/603 |
| 2011/0071709 | A1* | 3/2011 | Damiani | G06F 8/30 701/3 |

(Continued)

FOREIGN PATENT DOCUMENTS

| | | |
|---|---|---|
| EP | 3579109 A1 | 12/2019 |
| FR | 3019668 A1 | 10/2015 |

OTHER PUBLICATIONS

International Search Report mailed Oct. 21, 2020, issued in corresponding International Application No. PCT/EP2020/070839, filed Jul. 23, 2020, 4 pages.

*Primary Examiner* — Tyler J Lee
(74) *Attorney, Agent, or Firm* — CHRISTENSEN O'CONNOR JOHNSON KINDNESS PLLC

(57) ABSTRACT

A graphic data processing system including at least one core for graphic data processing, capable of interpreting in graphic form or as instructions the data exchanged via a human-machine interface distributed over one or more cores.

4 Claims, 3 Drawing Sheets

(56) References Cited

U.S. PATENT DOCUMENTS

| | | | |
|---|---|---|---|
| 2012/0319965 A1 | 12/2012 | Kurabayashi et al. | |
| 2015/0286589 A1* | 10/2015 | Zante | G06T 1/20 |
| | | | 710/305 |
| 2015/0379670 A1 | 12/2015 | Koker et al. | |
| 2016/0117152 A1* | 4/2016 | Baker | G06T 1/60 |
| | | | 717/149 |
| 2018/0373404 A1* | 12/2018 | Sivaratri | G01C 23/00 |
| 2019/0378236 A1* | 12/2019 | Wendlandt | G06F 9/5044 |

\* cited by examiner

[Fig 1]
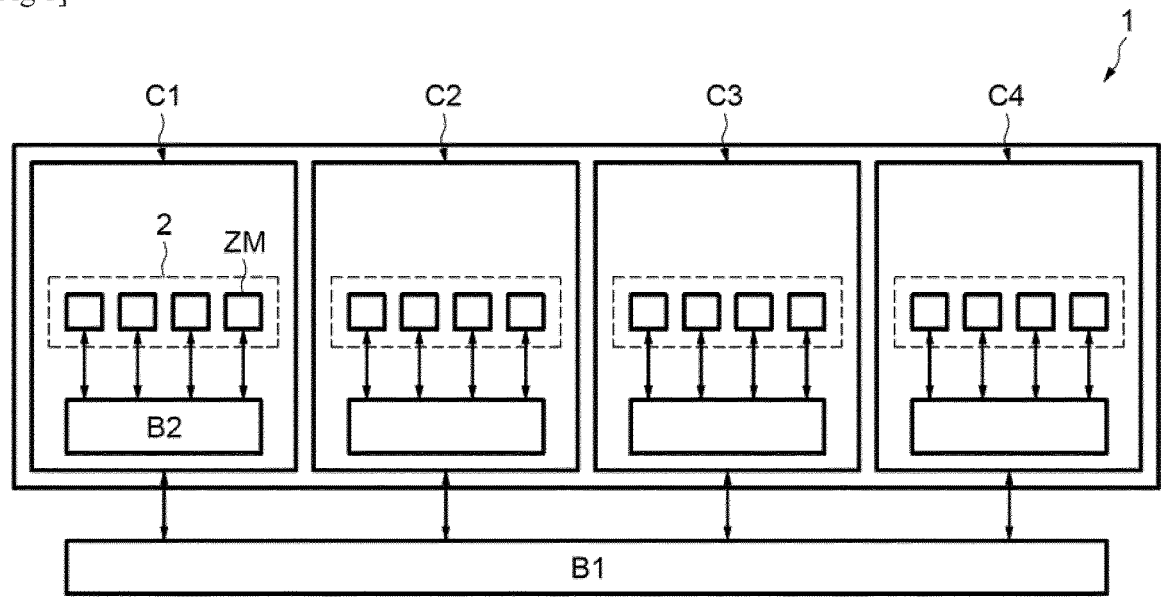
[Fig 2A]
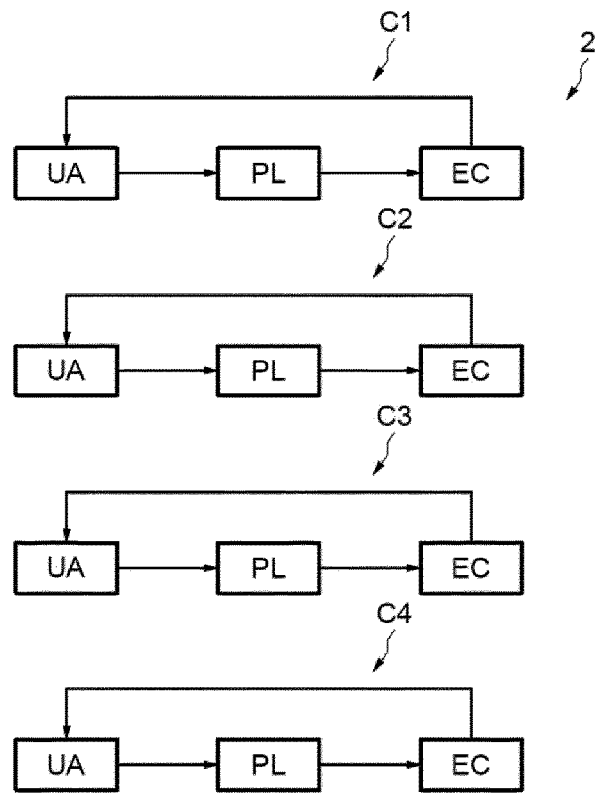

[Fig 2B]
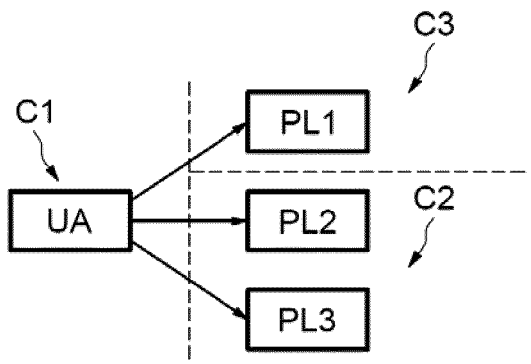
[Fig 2C]
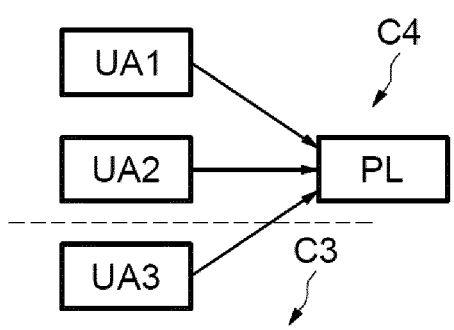

[Fig 2D]
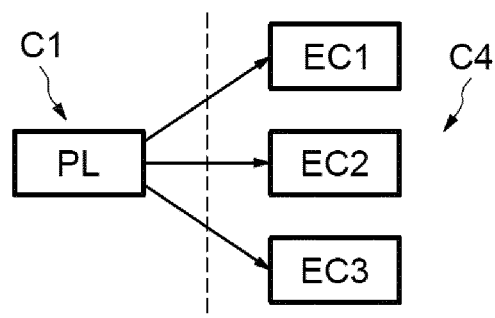
[Fig 2E]
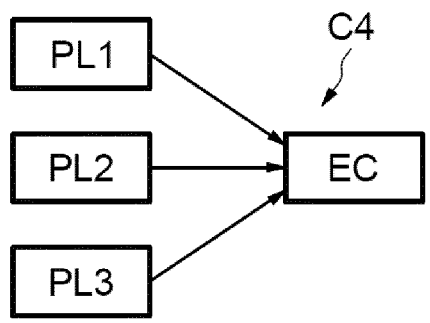

GRAPHIC DATA PROCESSING SYSTEM

CROSS-REFERENCE(S) TO RELATED APPLICATION(S)

This application is a National Stage of International Application No. PCT/EP2020/070839 filed Jul. 23, 2020, which claims priority to French Patent Application No. 1908358, filed Jul. 23, 2019, the entire disclosures of which are hereby incorporated by reference.

SUMMARY

The present invention relates to graphic data processing systems and more particularly to single-core and multi-core systems for graphical user interfaces.

It relates to a human-machine interface using such a processing system.

One particularly interesting application of the invention is that of data processing systems for human-machine interfaces on-board aircraft.

Thus, in this field, data processing systems are conventionally used to compute graphical calculations and create graphical content to be displayed on a screen of the interface. This can in particular concern creating graphical content with touch-sensitive regions that can be controlled manually, in this case by a pilot, in order to execute predefined functions.

In general, at least one graphics processing unit (GPU) is used to perform graphical calculations, in conjunction with at least one central processing unit (CPU).

GPU architectures are computing architectures that execute a set of instructions such as two-dimensional or three-dimensional calculations to generate an image.

GPUs can be composed of a single compute core or of multiple compute cores that divide up the graphics tasks. These processing architectures have partial or full parallelism.

With regard to data processing systems intended to be installed on board aircraft, as we understand it, this type of electronic system is subjected to significant constraints concerning control over the equipment used and determinism, which imposes the need to determine with certainty how the system will operate, for example with regard to the duration of data transfers. They require validation and certification by the competent authorities.

Data processing systems for on-board human-machine interfaces for commercial aircraft must thus comply with a certain number of development rules and recommendations.

In the prior art, on-board computing systems are generally built from commercial off-the-shelf (COTS) components, i.e. components manufactured in large quantities to reduce manufacturing and maintenance costs.

Typically, the components making up the processing chain for human-machine interfaces are grouped into a single region, for example a physical core.

A "processing chain" is understood to mean a series of modules configured on these components and comprising at least one graphic application, commonly referred to as a "User Application", hereinafter referred to as "UA", generating instructions for executing predefined graphical functions to assist with the piloting of aircraft.

The processing chain further comprises at least one graphics processing unit GPU and optionally a "Cockpit Display System", hereinafter referred to as "CDS" if there are no standards to comply with.

Finally, the processing chain is delimited by at least one peripheral device connected to one or more display screens, for example LCD screens.

Given the development time and the life span of an aeronautical product, which can span several decades, it is common for the components used to design the processing chain to in fact be obsolete even before the end of the design process, making periodic modification and re-certification phases necessary.

In other words, replacing one of these components with new, different components involves re-certifying all of the components in the processing chain to ensure that there is no interference, which can be time-consuming and costly.

Moreover, the requirements regarding the composition of the processing chain differ from industry to industry, thus requiring the supplier to reconfigure said modules, further modifying the location thereof, which may require certifications for each new configuration.

In view of the above, the invention proposes a solution to overcome the aforementioned constraints in a graphic data processing system.

According to a first aspect, the invention thus relates to a graphic data processing system comprising at least one graphic data processing core including formatting means capable of interpreting, in graphic format or in instruction format, the data exchanged via a human-machine interface, and wherein said formatting means are distributed between one or more cores.

The term "interpretation" is understood to mean the possibility of reading data in graphic format or in a programming language format, and of executing the actions requested or required as a result of this reading.

One example that can be mentioned is when a pilot presses a touch-sensitive button on his/her screen, which results, for example, in the triggering of an event and thus in the execution of a function.

The formatting means have thus interpreted data in graphic format.

Moreover, since pressing a touch-sensitive button can involve it changing its graphic format, data in instruction format will, in this case, be sent to the formatting means to modify said format of the button.

These formatting means are in this case distributed between one or more cores. In other words, each physical core is fully or partially partitioned and can include some or all of the formatting means.

This allows for incremental certification.

A part of the formatting means contained in a physical core can thus be updated without having to re-certify the other parts of the formatting means accessible via the other physical cores or contained in the same core.

Advantageously, the formatting means comprise conversion means capable of converting the data exchanged via the human-machine interface, either into graphic format or into instruction format, at least one processing module capable of generating the instructions, and display means capable of displaying said data in graphic format.

Said at least one processing module is coupled to the conversion means, which in turn are coupled to said display means.

A "processing module" is understood to mean any UA module capable of receiving data from sensors, for example, and of generating instructions to graphically represent said received data.

These instructions are sent to said conversion means. The processing module is also capable of receiving data following a human-machine interaction, for example a button press, and then of sending data in graphic instruction format to the conversion means to potentially modify the rendering of the button.

Once the graphic instructions have been received by the UA module, the conversion means allow for the computation functions of the display to be projected onto a screen, for example an LCD screen.

This projection is made possible by display means in the form of peripherals coupled to one or more display screens.

Preferably, the conversion means comprise at least one conformity module capable of conforming the data to an aeronautical or automotive communication and display standard, and at least one graphics processing unit capable of receiving the data resulting from the implementation of said at least one conformity module and of converting them into data suitable for display by the display means.

Said at least one conformity module is of the CDS type. In particular, the data received by said at least one processing module are made conformant with a standard such as "ARINC 661 Part 1" or "ARINC 661 Part 2".

Subsequently, these conformant data will be sent to at least one graphics processing unit GPU capable of executing computational functions to enable said data to be displayed in graphic format.

It goes without saying that the data can be distributed between a plurality of graphics processing units that can operate with partial or full parallelism.

Alternatively, the conversion means comprise at least one graphics processing unit capable of receiving the data resulting from the implementation of said at least one processing module and of converting them into data suitable for display by the display means.

In other words, the conversion means are optional in this case. For example, in the case where there are no standards that must be complied with, the UA processing module can send an altitude value to be displayed that does not generally require conformity with any standard.

Advantageously, the distribution of the formatting means is configurable.

Thus, the architecture comprising the formatting means is entirely modular. In other words, there can be, for example, one UA processing module per physical core.

This configuration is particularly advantageous since the updating of one UA processing module does not require updating and re-certifying the other UA processing modules.

This is also the case for the CDS module and the graphics processing unit GPU.

It should be noted that there can also be a set of UA processing modules and/or of CDS modules and/or of graphics processing units per physical core.

Another configuration can also be chosen at any time. For example, one or more CDS modules can be distributed between a plurality of physical cores or grouped into a single physical core.

Each graphics processing unit GPU is thus capable of addressing one or more display screens.

Preferably, the formatting means are connected to one another by means of at least one communication system capable of authorising data exchanges between said formatting means.

The communication system can be a common bus between the formatting means.

The invention further relates to a graphical user interface for an aircraft cockpit comprising a graphic data processing system as defined hereinabove.

DESCRIPTION OF THE DRAWINGS

Other purposes, features and advantages of the invention will appear after reading the following description, which is provided for purposes of illustration only and not intended to limit the scope of the invention, given with reference to the accompanying drawings, wherein:

FIG. 1 shows one example of the general architecture of a conventional data processing system produced using COTS components;

FIGS. 2A-2E show different alternative and example configurations of the formatting means according to the invention.

DETAILED DESCRIPTION

FIG. 1 shows the general architecture of a graphic data processing system according to the invention, of a human-machine interface, which has been given the general reference numeral 1.

The general architecture 1 in this case is a multi-core architecture. It goes without saying that this can be a single-core architecture.

It comprises, in this example embodiment, a set of physical data processing cores C1 to C4, in this case four, connected to one another by a communication system B1, in this case a shared communication bus capable of authorising data exchanges between said physical cores C1 to C4.

Each physical processing core is capable of operating completely or partially in parallel, allowing information to be processed simultaneously in order to perform the greatest number of operations in the shortest time.

As can be seen in the figure, each processing core C1-C4 comprises formatting means 2 capable of interpreting, in graphic format or in instruction format, the data exchanged via a human-machine interface not shown here.

In other words, the formatting means 2 are capable of reading data in graphic format or in a programming language format, and of executing the actions requested or necessary as a result of this reading.

The programming language can be the programming language C or C++ for example.

The formatting means 2 include a memory region partitioned into a set of memory regions ZM capable of storing programs involved in interpreting, in graphic format or in instruction format, the data exchanged via the human-machine interface.

Each program stored in a memory region ZM can communicate with another program stored in another memory region ZM within the same core C1-C4.

This communication can be carried out for example via a communication bus B2 capable of transferring the data resulting from said programs.

This multi-core graphic data processing architecture can be fully or partially partitioned.

This allows for incremental certification.

A part of the formatting means 2 contained in a physical core can thus be updated without having to re-certify the other parts of the formatting means 2 accessible via the other physical cores or contained in the same physical core.

In other words, in a partitioned architecture, a modification of a GPU or CDS or UA module contained in a partition avoids the need to re-certify the other modules contained in other partitions.

This partitioning is also modular, allowing for multiple possible alternative configurations of the formatting means 2, some of which are shown in FIG. 2A to 2E.

The formatting means 2 comprise at least three types of modules, illustrated in FIG. 2A, i.e., UA, display means EC in the form of peripherals, GPU and/or CDS, referred to here as PL.

These modules are configurable and partitioned in the cores C1-C4.

FIG. 2A shows a first example configuration. In this case, a single processing module UA is coupled to a single conversion module PL, which is in turn coupled to a single display peripheral, all in the same core C1.

This configuration is replicated in the other three cores C2, C3 and C4.

Thus, if one of these modules UA were to be modified, the other operational processing modules UA will not be updated and/or re-certified.

Alternatively, as shown in FIG. 2B, there can be a single processing module UA stored in the core C1, coupled to a first conversion module PL1 stored in the core C3, and coupled to a second and third conversion module PL2, PL3 respectively, stored in the core C2.

Another possible configuration, shown in FIG. 2C, would be to store a first and second processing module UA1, UA2 in the core C4 and to couple them to a conversion module PL stored in the same core C4.

The conversion module PL can also be coupled to a third processing module UA3 stored in the core C3, and to three display means EC1, EC2 and EC3 which are, as shown in FIG. 2D, in the core C4.

Alternatively, the first, second and third conversion modules PL1, PL2 and PL3, and the display means EC could be stored in the same core C4 as shown in FIG. 2E.

It goes without saying that these configurations are given as non-limiting examples.

Thus, the modular partitioning of the physical cores C1 to C4 allows the configuration of the formatting means 2 to be modified according to the needs of the system, while reducing the number of modules to be updated and/or re-certified should one thereof be modified.

The invention claimed is:

1. A graphic data processing system, comprising:
    at least two graphic data processing cores including formatting means capable of interpreting, in a graphic format or in a instruction format, data exchanged via a human-machine interface, wherein the at least two graphic data processing cores are fully or partially modularly partitioned and includes some of the formatting means, so that said formatting means are distributed between at least two cores of the at least two graphic data processing cores, wherein the formatting means comprise:
    conversion means capable of converting the data exchanged via the human-machine interface, either into the graphic format or into the instruction format;
    at least one processing module capable of generating the instruction format; and
    display means capable of displaying the data exchanged in the graphic format, wherein said at least one processing module being coupled to the conversion means, which in turn are coupled to said display means,
    wherein said processing module and at least one of said conversion means coupled to said processing module are stored in respective graphic data processing cores of the at least two graphic data processing cores that are distinct one from the other;
    wherein the conversion means comprise:
    at least one conformity module capable of conforming the data to an aeronautical or automotive communication and display standard; and
    at least one graphics processing unit capable of receiving the data exchanged resulting from the implementation of said at least one conformity module and of converting the data exchanged into data suitable for display by the display means.

2. The system according to claim 1, wherein the distribution of the formatting means is configurable.

3. The system according to claim 1, wherein the formatting means are connected to one another by means of at least one communication system capable of authorizing the data exchanges between said formatting means.

4. A graphical user interface for an aircraft cockpit, comprising:
    at least two graphic data processing cores including formatting means capable of interpreting, in a graphic format or in a instruction format, the data exchanged via a human-machine interface, wherein the at least two graphic data processing cores are fully or partially modularly partitioned and includes some of the formatting means, so that said formatting means are distributed between at least two cores of the at least two graphic processing cores, wherein the formatting means comprise:
    conversion means capable of converting the data exchanged via the human-machine interface, either into the graphic format or into the instruction format;
    at least one processing module capable of generating the instructions; and
    display means capable of displaying said data in the graphic format, wherein said at least one processing module being coupled to the conversion means, which in turn are coupled to said display means,
    wherein said processing module and at least one of said conversion means coupled to said processing module are stored in respective graphic data processing cores of the at least two graphic processing cores that are distinct one from the other;
    wherein the conversion means comprise:
    at least one conformity module capable of conforming the data to an aeronautical or automotive communication and display standard; and
    at least one graphics processing unit capable of receiving the data resulting from the implementation of said at least one conformity module and of converting the data exchanged into data suitable for display by the display means.

* * * * *